US000001059H

United States Statutory Invention Registration [19]

[11] Reg. Number: H1059

Konig

[43] Published: May 5, 1992

[54] FIBER OPTIC RF SIGNAL CHANNELIZER

[75] Inventor: Charles E. Konig, Staten Island, N.Y.

[73] Assignee: The United States of America as represented by the Secretary of the Army, Washington, D.C.

[21] Appl. No.: 656,916

[22] Filed: Feb. 19, 1991

[51] Int. Cl.[5] ..... H04J 1/02; H04J 14/02

[52] U.S. Cl. ..... 359/124; 359/193; 359/195; 370/123

[58] Field of Search ..... 350/96.15, 96.16, 96.13

[56] References Cited

U.S. PATENT DOCUMENTS

| | | | |
|---|---|---|---|
| H 292 | 6/1987 | Klose et al. | 342/394 |
| 4,443,801 | 4/1984 | Kolose et al. | 343/442 |
| 4,577,924 | 3/1986 | Mathis | 350/96.15 |
| 4,712,859 | 12/1987 | Albanese et al. | 350/96.15 X |
| 5,008,545 | 4/1991 | Anderson et al. | 350/96.15 X |

*Primary Examiner*—Bernarr E. Gregory
*Attorney, Agent, or Firm*—Michael Zelenka; William H. Anderson

[57] ABSTRACT

An array of fiber optic RF filters each responsive to a predetermined wavelength forms a channelizer for a wide bandwidth receiver used in a dense signal environment having complex modulations. Each fiber optic RF filter comprises a resonant cavity formed from a section of multimode optic fiber with a dielectric mirror deposited at each end and wherein the cavity length corresponds to one half the respective modulation signal wavelength of optical energy fed into the filter optic cavity from a laser diode which is modulated by the received RF energy.

11 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FIBER OPTIC RF SIGNAL CHANNELIZER

GOVERNMENT INTEREST

The invention described herein may be manufactured, used, and licensed by or for the Government for governmental purposes without the payment to me of any royalty thereon.

FIELD OF THE INVENTION

This invention relates to the detection of a wide spectrum of radio frequency signals and more particularly to the detection of radio frequency signals in a dense signal environment with complex modulations.

BACKGROUND OF THE INVENTION

Several frequency source identification methods are generally known in the prior art. The most well known of these is probably what may be termed "standard heterodyning techniques". This technique tunes a heterodyne receiver for peak output provides a readout of the frequency in question. This technique is relatively time consuming and becomes impossible when the signal source is hopping or changing rapidly in frequency. One known technique for signal detection where signal hopping is involved involves the use of a compressive receiver. In this type of receiver, an input signal is mixed with a chirp signal and swept through the intermediate frequency band for a designated time of arrival. The signal's position and time is therefore indicative of its frequency. One example of this type of apparatus is disclosed in U.S. Pat. No. 4,443,801 issued to D. R. Klose et al, which issued on Apr. 17, 1984, and which discloses the use of SAW interferometer processor apparatus which performs high resolution measurements on multiple signals of different frequency.

A SAW channelizer compressive interferometer is a combination of two basic and well known technologies, namely, a SAW channelizer and a compressive interferometer. A conventional SAW channelizer measures the pulsewidth (PW), pulse amplitude (PA), and time of arrival (TOA) while compressive angles of arrival (AOA) channels measure AOA and frequency. A SAW channelizer is comprised of a contiguous bank of SAW filters arranged to sort the received signal into frequency bins, with the frequency bin width being selected by the minimum pulsewidths to be intercepted. The filters also have sharp cut off frequencies to enable them to discern strong vs. weak signals in adjacent channels. A compressive interferometer is a spin off of a microscan receiver where AOA is measured from antenna input phase differentials along with the frequency of multiple signals in the IF passband. Conventional SAW based compressive interferometers, however, suffer from having too many filters in the channelizer to measure pulsewidth.

SUMMARY OF THE INVENTION

It is an object of the present invention, therefore, to detect a wide spectrum of radio frequency signals, whether or not those signals are received coincidentally.

It is a further object of the invention to provide an improvement in a channelized type of RF receiver.

It is yet another object of the invention to provide an alternate configuration for a wide band compressive interferometer and SAW channelizer.

Briefly, the foregoing and other objects of the invention are provided by an array of fiber optic signal filters arranged as bandpass filters to form a channelizer, with each filter being constructed from a resonant cavity formed from a section of multimode optic fiber with a dielectric mirror disposed at each end and whose respective cavity length corresponds to one half the center frequency of the filter. Each channel, moreover, includes a laser diode connected between the RF input and the filter input and a laser detector diode connected between the filter output and a signal output.

BRIEF DESCRIPTION OF THE DRAWINGS

These and other objects, features and details of the invention will become apparent in light of the ensuing detailed disclosure, and particularly in light of the drawings wherein.

DETAILED DESCRIPTION

Prior to considering the details of the subject invention, the operation of a compressive receiver will first be described. A compressive receiver is based upon pulse compression and is formulated on the correlation properties of phase coded waveforms, linear frequency modulation or chirps. SAW technology has typically been used for pulse compression. One approach is to employ a frequency mixer for the RF input and the output of a swept or chirped local oscillator followed by a compressor implementing what is known as a multiply long, convolve, short (ML-CS) configuration. The chirp slopes of the sweeping local oscillator and the compressor are designed to match so that an output defining a sin x/x function is provided.

In the present invention, the heretofore used SAW filter bank is replaced by an array of fiber optic filters designed as a bank of bandpass filters.

Figure 1:
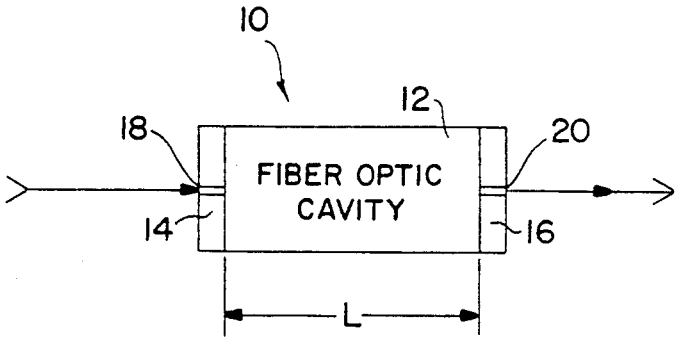
FIG. 1 is a functional block diagram of a fiber optic filter.

Referring now to FIG. 1, shown thereat is a fiber optic RF bandpass filter 10 comprised of a predetermined length of multimode optic fiber 12 and a pair of dielectric mirror elements 14 and 16 deposited on each end. Small holes or apertures 18 and 20 are formed in the mirrors 14 and 16 for the passage of optical energy respectively in and out of the cavity 12. The cavity length is chosen to be one half the modulation wavelength $\lambda_m = c/f_c$ where c is the speed of light ($3\times10^{8 m/sec}$) and $f_c$ is the modulation frequency of modulation imposed on the carrier light injected into the cavity 12. The cavity 12, therefore, is not resonant at the frequency of the optical carrier, but to the modulation on the carrier. Thus one would choose the length L to match the center frequency of the band of modulation frequencies $f_c$ in accordance with the expression $L = c/2nf_c$ where n is the refractive index of the fiber. Operation with non-coherent light and/or a highly multimode fiber results in averaging overoptical resonances within the cavity. Thus the filter acts only on power variations and is independent of the optical wavelength of the light carrier of the energy entering the hole 18 into the cavity 12.

This now leads to a consideration of the preferred embodiment of the invention which comprises an array of fiber optical bandpass filter channels 1–n. Each of the bandpass filter channels are coupled to an RF input which is receptive to a wide band of frequencies which can be separated into a plurality of spectrum samples or frequency bins distributed over the frequency range of interest.

Figure 2:
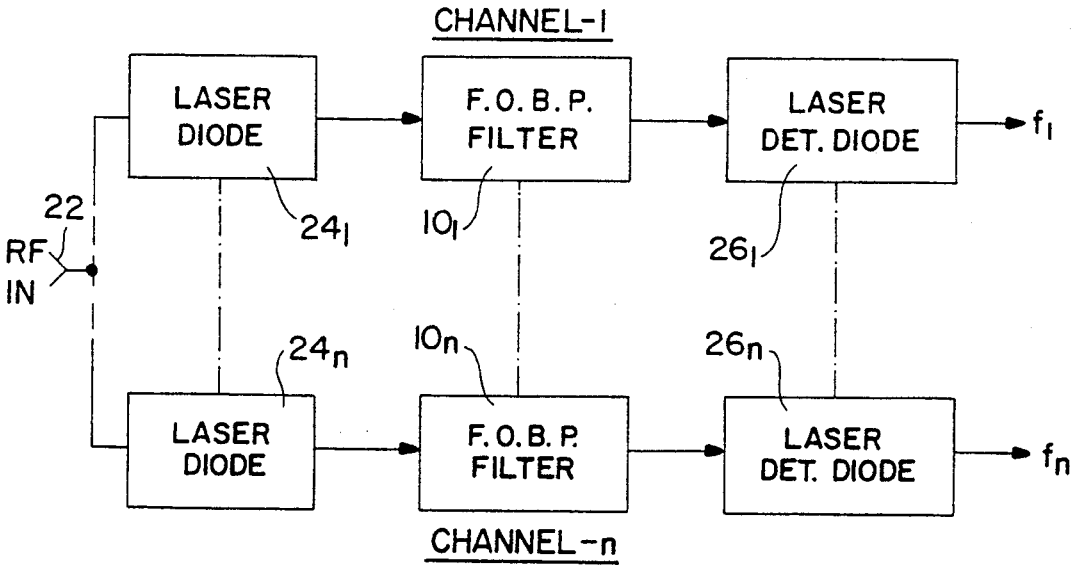
FIG. 2 is an electrical block diagram of the preferred embodiment of the invention utilizing fiber optic bandpass filters as shown in FIG. 1 in each of the channels.

Accordingly, each channel or frequency bin is comprised of a fiber optic bandpass filter $10_l$ so that the first channel includes the filter $10_l$, while the last channel includes the filter $10_n$. Each of the fiber optic bandpass filters $10_l$–$10_n$ are coupled to the output of a respective laser diode $24_l$–$24_n$ which is modulated by the RF input at 22. Each of the bandpass filters $10_l$–$10_n$ have predetermined different center frequencies as determined by the respective lengths of the optical fibers 12 from which they are fabricated. Each of the fiber optic bandpass filters $10_l$–$10_n$ have their respective optical outputs fed to respective laser detector diodes $26_l$–$26_n$ which in turn output frequencies $f_l$–$f_n$ of the respective frequency bins. When desirable, the n number of laser diodes can be replaced by a single laser diode and modulator element 24 whose output would be commonly coupled to all of the fiber optic bandpass filters $10_l$–$10_n$. The frequency outputs $f_l$–$f_n$ when mixed or heterodyned with a swept local oscillator, not shown, provides IF signals.

Where the array of bandpass filters as shown in FIG. 2 are included in electronic support measure (ESM) receivers used for electronic waveform applications, for example, there is provided an improved means for detecting radar signals as well as their angles of arrival and also to the direction finders, etc. over a frequency range, for example, between 500 MHz and 18 GHz.

Having thus shown and described what is at present considered to be the preferred embodiment of the invention, it should be noted that the same has been made by way of illustration and not limitation. Accordingly, all modifications, alterations and changes coming within the spirit and scope of the invention are herein meant to be included.

What is claimed is:

1. A frequency channelizer for determining the frequency of a plurality of received radio frequency signals over a predetermined bandwidth, comprising:

a plurality of predetermined bandwidth frequency detection channels coupled to an RF signal input, each channel including a fiber optic bandpass filter having a predetermined different center frequency selectively chosen within said bandwidth for channeling signals for detection within a plurality of frequency bins.

2. The frequency channelizer of claim 1 wherein each filter optic bandpass filter is further comprised of a fiber optic cavity and mirror means having light apertures therein located at opposite ends of said cavity.

3. The frequency channelizer of claim 2 wherein said fiber optic cavity is comprised of a length of optical fiber.

4. The frequency channelizer of claim 3 wherein the length of said optical fiber is a function of the center frequency of the bandpass of the respective filter.

5. The frequency channelizer of claim 3 wherein the length of said optical fiber is substantially equal to one half the wavelength of the respective center frequency.

6. The frequency channelizer of claim 3 and wherein said mirror means comprises a pair of dielectric mirrors secured to each end of said optical fiber.

7. The frequency channelizer of claim 1 and additionally including light modulation means coupled to and responsive to said RF signal input for generating a modulated optical signal which is then coupled to each said fiber optic bandpass filter.

8. The frequency channelizer of claim 7 wherein said light modulation means comprises laser diode means.

9. The frequency channelizer of claim 8 wherein said laser diode means comprises a laser diode coupled between said RF signal input and each said fiber optic bandpass filter.

10. The frequency channelizer of claim 7 and additionally including light demodulation means coupled to each of said fiber optic bandpass filter.

11. The frequency channelizer of claim 10 wherein said light demodulation means comprises a laser detector diode.

* * * * *